United States Patent

Barkan et al.

Patent Number: 5,902,986
Date of Patent: May 11, 1999

[54] BAR CODE READER WITH MEANS FOR DISCRIMINATING BETWEEN A MOVING INDICIA AND A STATIONARY INDICIA

[75] Inventors: Edward Barkan, Miller Place; Joseph Cai, Sayville; Daniel R. McGlynn, Brooklyn, all of N.Y.

[73] Assignee: Symbol Technologies, Inc., Holtsville, N.Y.

[21] Appl. No.: 09/032,509

[22] Filed: Feb. 27, 1998

Related U.S. Application Data

[62] Division of application No. 08/508,585, Jul. 28, 1995, Pat. No. 5,773,807.

[51] Int. Cl.⁶ ....................................................... G06K 7/10
[52] U.S. Cl. ........................... 235/462; 235/472; 235/454; 235/459; 235/466
[58] Field of Search ................................... 235/462, 472, 235/454, 459, 466

[56] References Cited

U.S. PATENT DOCUMENTS

| | | | |
|---|---|---|---|
| 5,139,100 | 8/1992 | Brauneis | 235/383 |
| 5,174,399 | 12/1992 | Braineis | 235/383 |
| 5,256,864 | 10/1993 | Rando et al. | 235/462 |
| 5,307,423 | 4/1994 | Gupta et al. | 382/11 |
| 5,324,924 | 6/1994 | Cai et al. | 235/463 |
| 5,408,080 | 4/1995 | Zazzu et al. | 235/462 |
| 5,475,207 | 12/1995 | Bobba et al. | 235/467 |
| 5,656,804 | 8/1997 | Barkan et al. | 235/472 |

Primary Examiner—Anita Pellman Gross
Assistant Examiner—Douglas X. Rodriguez
Attorney, Agent, or Firm—Kirschstein, et al.

[57] ABSTRACT

A reader generates a scanning beam for reading a bar code symbol on a selected item. The reader includes a motion sensor or software program for discriminating between the selected item and other items also having bar code symbols thereon. The motion sensor or software program for discriminating between the items may discriminate between an item swept past the reader and stationary items, or an item moved into the field of view of the reader, held stationary and moved out of the field of view and stationary or moving items or between an item placed within a predetermined distance range and other items.

11 Claims, 4 Drawing Sheets

5,902,986

BAR CODE READER WITH MEANS FOR DISCRIMINATING BETWEEN A MOVING INDICIA AND A STATIONARY INDICIA

CROSS REFERENCE TO RELATED APPLICATION

This application is a division of U.S. application Ser. No. 08/508,585, filed Jul. 28, 1995, now U.S. Pat. No. 5,773,807.

BACKGROUND OF THE INVENTION

1. Field of the Invention

The present invention relates to a reader for reading an indicia, for example a reader for reading bar code symbols on products at a point of sale transaction terminal.

2. Discussion of the Prior Art

In prior art readers comprising a scanner and a decoder, the scanner generates a scanning spot which traverses the target indicia such as a bar code symbol and light reflected from the bar code symbol is received by the decoder wherein a digital electrical signal is generated and analyzed to decode the information contained in the bar code symbol.

When such a bar code reader is used, for example at a point of sale, to read a bar code symbol on a product being purchased the scanning beam may not be directed exclusively at the target bar code symbol but may also scan and be reflected by bar code symbols on neighboring items which it was not intended to scan. The reflected scanning beam from the other items may be received by the decoder as a result of which incorrect information may be generated. As a specific example of such a problem, where a product being purchased is scanned at a supermarket point of sale the scanning beam may also be reflected by, for example, magazines on a magazine rack adjacent to a supermarket point of sale.

It will be appreciated therefore that the conventional bar code reading system can give rise to problems when items having bar code symbols are found adjacent or nearby the item to be scanned.

U.S. Pat. No. 5,408,080 which is incorporated herein by reference describes a bar code scanner capable of automatically scanning bar code data without a manually activated trigger to initiate a scan of bar code data. The scanner includes a light source for illuminating the bar code symbol, a photodiode array for detecting light reflected by the bar code symbol, a CCD shift register for converting the data generated in parallel in the photodiode array to a serial format and a digitizer circuit for converting the data to digital pulses. The digitized signal corresponding to the serial data is produced during a read-out period and the signal is examined to establish whether a valid bar code symbol has been read; a valid bar code symbol is indicated when the signal comprises a given number of pulses (for example, eight pulses) each pulse corresponding to a bar in the bar code symbol. The scanner continues to scan until a valid bar code symbol has been identified at which point the scan cycle is terminated. The scan cycle is recommenced after a predetermined number of successive read-out intervals following the reading of the valid bar code symbol. In order to ensure that the same bar code is not read again the number of pulses in each of the predetermined number of read-out intervals is monitored. U.S. Pat. No. 5,408,080 relates only to a static beam or field of view optical reading system.

U.S. Pat. No. 5,324,924, which is commonly assigned with the present application and incorporated herein by reference, describes an arrangement for decoding of bar code symbols in which a symbol is scanned by a light beam, light reflected from the symbol is sensed by a detector and the detected time widths (the length of time spent by the scanning light beam traversing a bar or space) are compared with a threshold value to determine if the bar code symbol is within the working range of the bar code scanner. For example, if the detected time width is smaller than a predetermined threshold value then a bar code symbol is outside a predetermined distance zone. A second evaluation is then performed to establish whether the detected bar code symbol is a valid bar code symbol i.e. it has all of the characteristics of a valid bar code symbol (for instance a check may be carried out to ensure that the detected bar code symbol has a sequence of bar and space widths which conform to the methodology of acceptable bar code symbols). Once a successful scan of a given bar code symbol has taken place any scans of an identical bar code symbol within a predetermined time is ignored on the assumption that it is the same bar code symbol that is being read. In a preferred embodiment the arrangement is provided in a gun-shaped device having a trigger allowing manual activation of the scanning light beam.

SUMMARY OF THE INVENTION

Accordingly it is a primary object of the present invention to provide a reader which at least alleviates the difficulties mentioned above.

It is an additional object of the present invention to provide a reader which can differentiate between a selected item to be scanned and adjacent or nearby items also having bar code symbols thereon.

According to the present invention there is provided a reader for reading an indicia such as a bar code symbol, the reader comprising:

an optical arrangement for focusing a light beam within a field of view on an indicia on a target to be read;

a sensor for detecting the light reflected off the indicia and for generating an electrical signal indicative of the detected light intensity;

means for discriminating between an indicia on a target moving with respect to the reader and an indicia on a stationary target in the field of view; and means for producing an output signal corresponding only to the data of the indicia on the moving target.

Because the item having the bar code to be read would normally be moved into the field of view in order for reading to take place, the reader will automatically discriminate between that item and other adjacent items simply and easily, without the need for additional steps to be taken.

According to the present invention there is further provided a reader for reading an indicia such as a bar code symbol, the reader comprising:

an optical arrangement for focusing a light beam within a field of view on an indicia on a target to be read;

a sensor for detecting the light reflected off the indicia and for generating an electrical signal indicative of the detected light intensity;

means for discriminating between an indicia on a target that is stationary or moving with respect to the reader and an indicia on a target being moved into the field of view and then held relatively stationary for a period of time; and means for producing an output signal corresponding only to the data of the indicia on the target moved into the field of view and then held relatively stationary for a period of time.

The invention thus distinguishes between items presented to the reader and items that are fixed, or constantly moving with respect to the reader.

In a preferred embodiment of the invention the means for discriminating may comprise software for measuring the period of time the light beam dwells on an indicia on the target or means for computing the distance to the symbol based upon predetermined symbol density. The means for detecting may include an infra red motion or proximity detector, or a dwell time measurement means for detecting the period of time that the light beam dwells on an indicia on the target. The optical arrangement may comprise a laser scanner, the dwell time measurement means detecting the number of scans to compute the dwell time.

According to the present invention there is still further provided a reader for reading an indicia such as a bar code symbol, the reader comprising:

an optical arrangement for focusing a light beam on a target to be scanned;

a sensor for detecting the light reflected off the target and for generating an electrical signal indicative of the detected light intensity;

means for determining the distance between an indicia on a target and the reader; and means for producing an output signal corresponding only to the indicia on targets in a predetermined distance zone from the reader. In order to distinguish the target item from other items with other bar code symbols it is, therefore, necessary only to place the item in the predetermined distance zone, providing a simple method of distinguishing the items.

The means for determining the distance may comprise a relative size detector, a proximity detector or an angular displacement detector.

According to the invention there is still further provided a reader reading an indicia such as a bar code symbol, the reader comprising:

an optical arrangement for focusing a light beam within a field of view on an indicia on a target to be read;

an sensor for detecting light reflected off the indicia and for generating an electrical signal indicative of the detected light intensity; and means for comparing the computed probability of specific indicia being scanned with the known likelihood of such indicia being scanned based upon frequency of usage data associated with each indicia stored in a file.

According to the invention there is still further provided a reader for reading a plurality of indicia such as bar code symbols presented adjacent one another, the reader comprising:

a hand-held optical arrangement for manually traversing a scanning light beam across the indicia to be read;

a sensor for detecting the light reflected off the indicia and for generating an electrical signal indicative of the detected light intensity; and means for identifying discrete indicia by monitoring the dwell time of the light beam on each indicia.

According to the invention there is provided a method of reading an indicia such as a bar code symbol in which a reader comprises an optical arrangement for focusing a light beam on an indicia; and a sensor for detecting light reflected off the indicia in which:

the optical arrangement focuses a light beam within a field of view on an indicia on a target to be read;

the sensor detects the light reflected off the indicia and generates an electrical signal indicative of the detected light intensity; and an indicia on a target moving with respect to the reader is distinguished from indicia on stationary targets in the field of view by discriminating means and an output signal is produced corresponding only to the data of the indicia on the moving target.

According to the invention there is further provided a method of reading an indicia such as a bar code symbol in which a reader comprises an optical arrangement for focusing a light beam on an indicia; and a sensor for detecting the light reflected off the indicia in which:

the light beam is focused within a field of view on an indicia on a target to be read by the optical arrangement;

light reflected off the indicia is detected by the sensor and an electrical signal is generated indicative of detected light intensity; and an indicia on a target that is moving with respect to the reader is distinguished from an indicia on a target being moved into the field of view and then held relatively stationary for a period of time by discriminating means and an output signal is produced corresponding only to the data of the indicia on the target moved into the field of view then held stationary for a period of time.

According to the invention there is still further provided a method of reading an indicia such as a bar code symbol in which a reader comprises an optical arrangement for focusing a light beam on a target to be scanned; and a sensor for detecting the light reflected off the target in which:

the light beam is focused by the optical arrangement on the target, light reflected off the target is detected by the sensor and an electrical signal indicative of the detected light intensity is generated, the distance between an indicia on the target and the reader is determined by determining means and an output signal corresponding only to the indicia on targets in a predetermined distance zone from the reader is produced.

According to the invention there is still further provided a method of reading an indicia such as a bar code symbol in which a reader comprises an optical arrangement for focusing a light beam on an indicia; and a sensor for detecting light reflected off the indicia in which:

a light beam is focused within a field of view on an indicia on the target to be read by the optical arrangement;

light reflected off the indicia is detected by the sensor and an electrical signal indicative of the detected light intensity is generated; and the computed probability of specific indicia being scanned is compared with the known likelihood of such indicia being scanned based upon frequency of usage data associated with each indicia.

According to the invention there is still further provided a method of reading a plurality of indicia such as bar code symbols presented adjacent one another in which a reader comprises a hand-held optical arrangement for focusing a scanning light beam on an indicia to be read; and a sensor for detecting the light reflected off the indicia in which:

the scanning light beam is manually traversed across the indicia to be read; and light reflected off the indicia is detected by a sensor and an electric signal indicative of the detected light intensity is generated and discrete indicia are identified by identifying means by monitoring the dwell time of the light beam on each indicia.

The invention extends to any one or more of the above features either taken alone or in any compatible combination.

BRIEF DESCRIPTION OF THE DRAWINGS

The invention may be carried out in a number of ways and one specific embodiment will now be described, by way of example, with reference to the accompanying drawings of which.

DETAILED DESCRIPTION OF THE PREFERRED EMBODIMENTS

Figure 1:
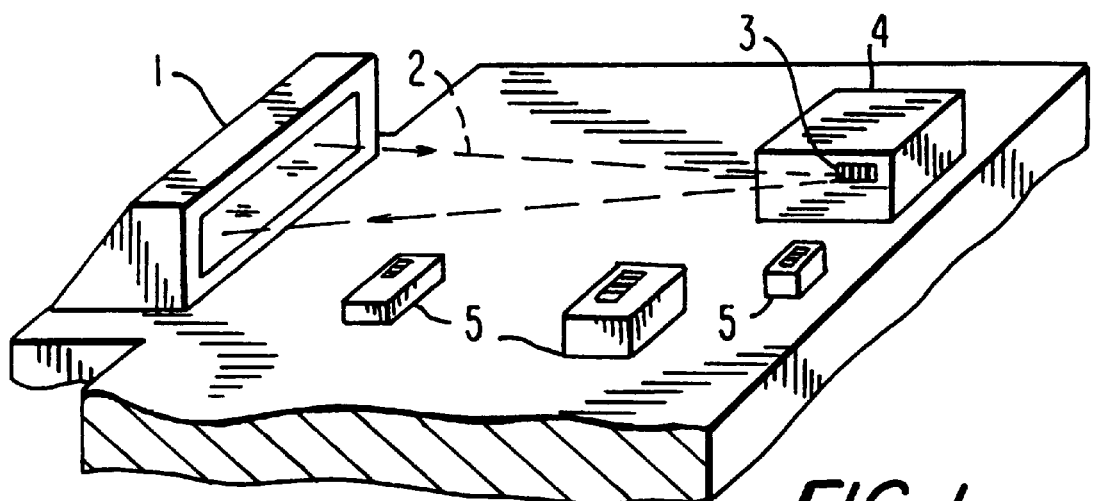
FIG. 1 illustrates schematically a reader according to the present invention.

A reader 1 comprising a light generating means and a light detecting means (not shown) is shown in FIG. 1. A scanning light beam 2 from the reader 1 scans a bar code symbol 3 on a target item to be scanned 4. For example, the item 4 may be one of a plurality of items to be purchased being scanned at a supermarket point of sale. It is desired, however, to scan only one item at a time, as each item is being presented to the reader, and to ensure that bar code symbols on other items such as those denoted by reference numeral 5 are not read at the same time, as this will give rise to an erroneous signal and incorrect information. The additional items 5 could, for example, be products which have already been scanned forming part of the same purchase as item 4 or items for sale on nearby stands such as magazines on a magazine rack.

Figure 2:
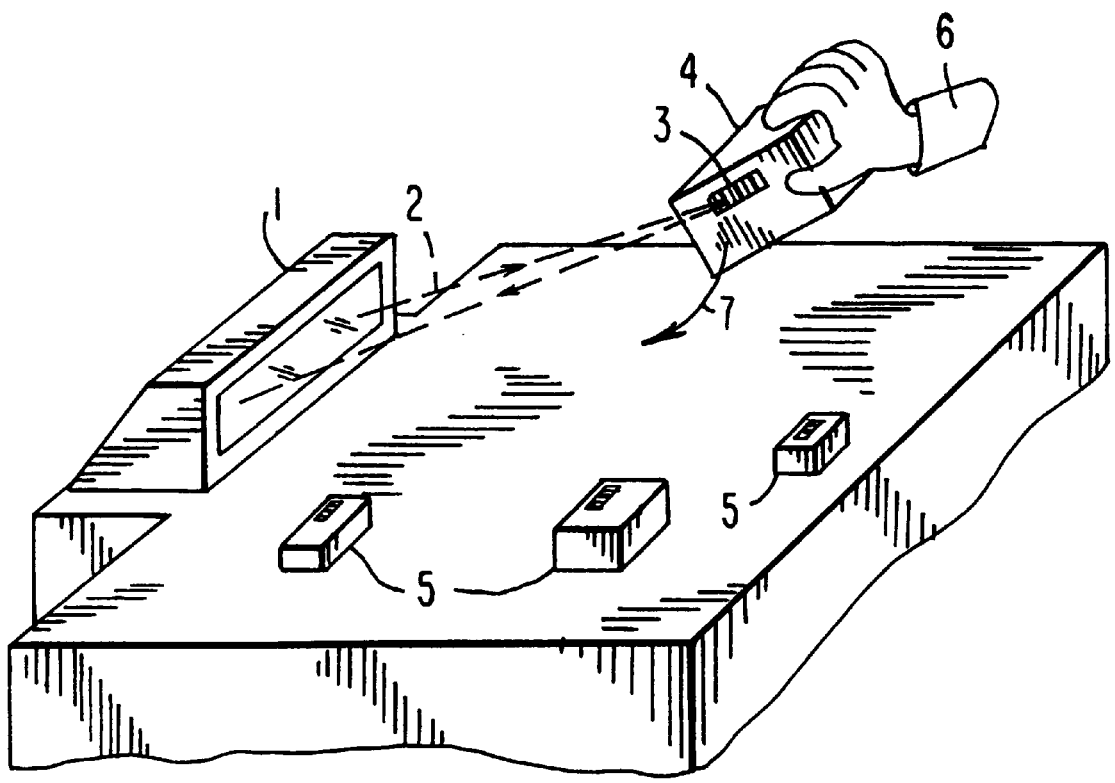
FIG. 2 illustrates schematically an item having a bar code symbol thereon being brought into the field of view of the reader.

In order to distinguish between the item 4 and other nearby items 5 one approach taken by the present invention is to provide means associated with the reader for distinguishing between an item specifically presented to the field of view of the reader 1 and other items nearby. As shown in FIG. 2 the item 4 containing the indicia 3 to be scanned is presented to the reader 1 by a sales assistant 6 by moving the selected item 4 into the field of view of the reader (see arrow 7). The item can either be moved in and out of the field of view in a continuous action or moved into the field of view, and then held stationary for a predetermined period. In either case the selected item can thus be distinguished from the other items 5.

One means of distinguishing between the selected item and other items makes use of comparing the scan count associated with repetitively scanning the selected item. Typically the beam is scanned at 30 scans per second. Accordingly, when an item 4 carrying a bar code symbol 3 is swept past the reader 1 (sweep-through mode) the bar code symbol 3 will be scanned a given number of times dependent on the length of time that the item 4 spends in the field of view ("dwell time"). For example, if the item 4 remains in the field of view for one second then the bar code symbol 3 will be scanned thirty times. Conversely an item 5 that remains stationary in the field of view will be scanned an unlimited number of times. Accordingly the bar code symbol 3 on the item 4 to be selected can be distinguished from bar code symbols on other items 5 by considering the dwell time of the item, that is, by comparing the number of scans for different bar code symbols and ignoring all signals corresponding to bar codes having a dwell time greater than a predetermined period.

Similarly, when a selected item 4 is moved into the field of view, held stationary for a given period and then moved out of the field of view (presentation mode) it will have a shorter dwell time than other items remaining stationary in the field of view. The reader can be programmed to select one or other modes of reading i.e. either the sweep-through mode or the presentation mode. The dwell time can, of course, be programmed to any desired period. A trigger or other manually operable control can be provided for setting the various parameters of operation. Where the reader 1 comprises a static beam, field of view optical system, instead of considering the number of scans that have been made of respective bar code symbols, the period of time during which the bar code symbol has been detected may be taken into consideration.

Alternatively, the means provided on the reader 1 for distinguishing between the selected item 4 and the other items 5 may comprise a motion detector. Various motion detectors are known, for example a pulsed infra red light beam, Doppler effect detectors or ultrasound pulse detectors. In addition using several detectors spaced at different locations a positional detector may be included which locates the selected item using trigonometrical calculations. Accordingly the selected item can be detected and its position located in order for its bar code symbol to be read in isolation, the reflected light from symbols on other items nearby being ignored by the reader.

Instead of the selected item 4 being simply swept past the reader 1 the item could be moved into the field of view, held stationary for a period of time and then moved out of the field of view. In that case the reader would identify the item either by virtue of it being moved into the field of view, or by detecting that it was held stationary for a predetermined period of time in between being moved into and out of the field of view.

Figure 3:
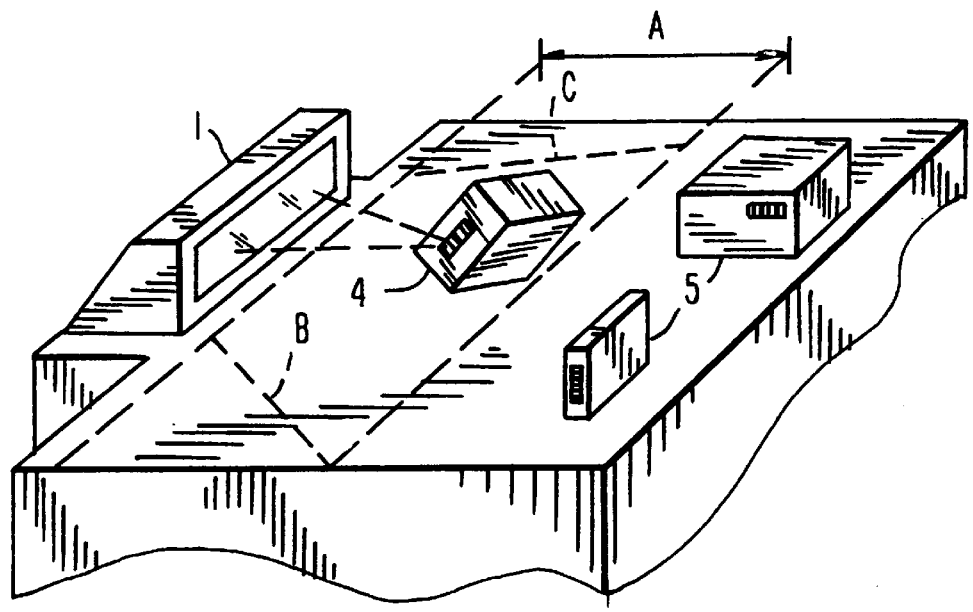
FIG. 3 shows schematically a reader having a predetermined range of reading distances.

In an alternative arrangement the reader 1 includes means for distinguishing between a target having a bar code symbol positioned within a predetermined distance range or zone from the reader and other items 5 outside that range. Such an arrangement is shown in FIG. 3, the predetermined distance range being given as A. The distance range A could also be limited to a narrow range of angles bounded by lines B and C so that only items in a small zone of distances would be read. One means of estimating the distance to the selected item 4 would be by comparing the relative apparent sizes of bar code symbols appearing on items at different distances. Typically bar code symbols on all items within a given store or inventory system will be of a standard size. Accordingly, bar code symbols on items closer to the reader will appear larger than bar code symbols on items that are further away and the scanning beam will spend a larger proportion of its time scanning each element of the bar code symbol on a closer item than on an item further away. Thus, for a standard density symbol, the distance to the reader can be derived. Accordingly, a given distance range can be selected by ignoring signals relating to bar code symbols having sizes outside a predetermined range, the predetermined range being based on the proportion of time that a scanning beam spends traversing the bar code symbol. Such a distance range could to be, for example, in the range of three to nine inches (7.5–22.5 cm). Where the reader 1 comprises a static beam, field of view optical arrangement, the size of the image of the bar code symbol detected by, for example, the scan time from "start" to "stop" characters by a laser scanner, or the distance between each character as detected by a CCD device can be used to establish whether the item is within the predetermined distance range. Alternatively the reader 1 could include a proximity detector which, when it detected items placed within the distance range or reading zone would activate the bar code reader.

Figure 4:
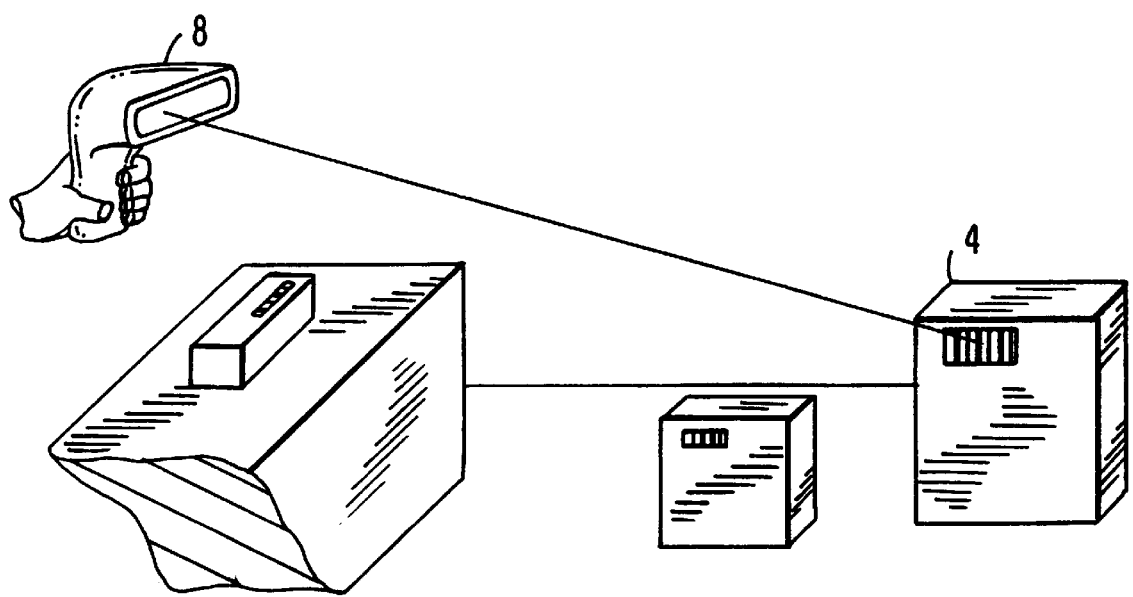
FIG. 4 shows an alternative embodiment of the scanner shown in FIG. 1.

FIG. 4 shows an alternative embodiment in which a hand-held scanner 8 is used instead of the stationary bar code reader 1.

In a further variation, it will be noted that in, for example, a given supermarket or inventory system only certain goods will be carried in which case a memory file containing records of all bar codes assigned to the various goods will be correspondingly limited. For example, in a supermarket, the house computer will carry the bar codes for all of the goods carried by a store so that if a bar code that is not familiar to the house computer is detected then it can be immediately identified. In addition, where a misread takes place which casts doubt on a given integer of a bar code then comparison can be made with the stored codes to arrive at the most likely correct code corresponding to the item read.

Figure 5:
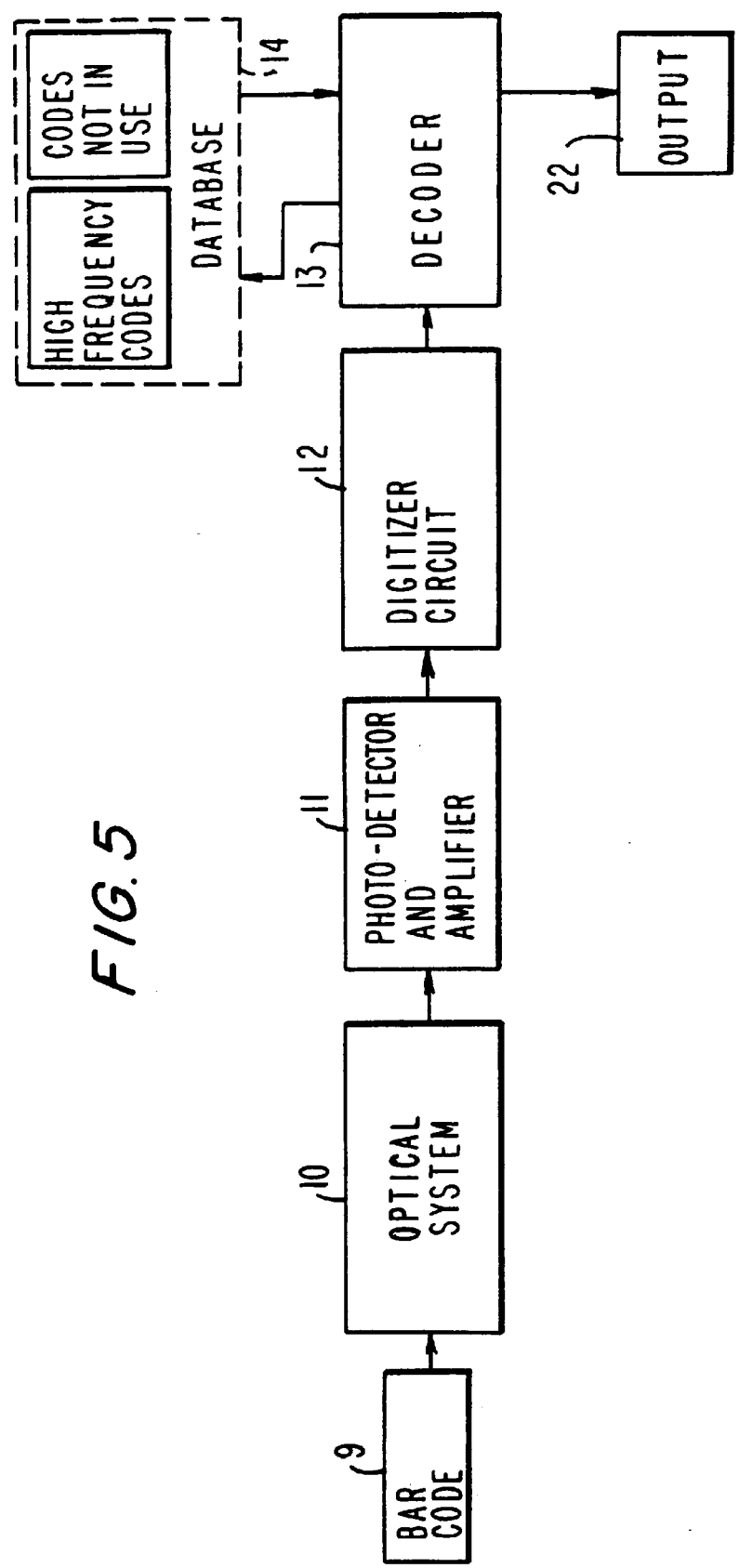
FIG. 5 shows a block diagram showing the operation of an embodiment of the invention.
Figure 6:
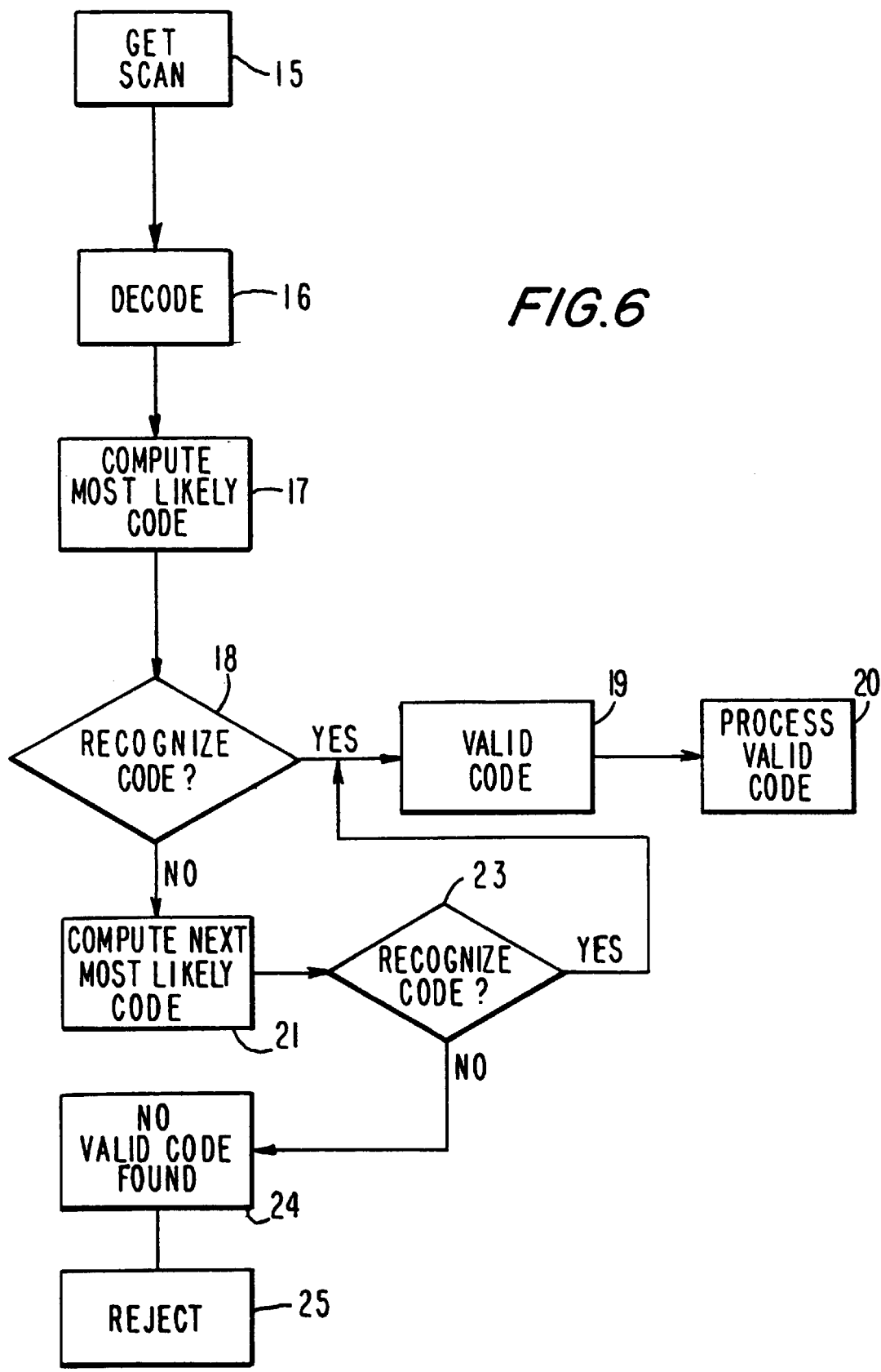
FIG. 6 shows a flow chart showing the operation of an embodiment of the invention.

The operation of the embodiment will now be described in more detail with reference to FIGS. 5 and 6. As shown in the block diagram of FIG. 5 a bar code symbol 9 is detected by an optical system 10 including a photodetector and amplifier 11 and information relating to the bar code symbol is digitized by a digitizer circuit 12, the digitized information being decoded by a decoder 13. The decoded information is then compared with information already stored in a database 14. The database 14 contains information concerning, for example, all codes that are used in the system, the frequency of usage of each code, and details of codes that are currently not in use. FIG. 6 shows the process by which the comparison is made. The scan is first obtained [15] and decoded [16] and a comparison is made with stored codes [17]. If the code is recognized [18] that is, if it corresponds with a stored code, it is noted as a valid code [19] and the valid code is processed [20]. Code recognition is carried out on a "probabilistic" basis that is to say, the relative probabilities of the bar code symbol representing a given code are compared and the code with the highest probability selected. As a simplified example the bar code symbol may be read and decoded, a 10% probability assigned to the code being, for example, "123" and a 90% probability of the code being "124". If the code having the highest probability is not valid and does not correspond with a stored code, then the validity of the next most probable code ("123" in the simplified example) is evaluated [21] and if it is valid [23], it is then processed [20] and is sent to an output 22 shown in FIG. 5. If no valid code is recognised, or if the probability of the code being a valid code is below a given threshold value or confidence level [24] then the results of the scan are rejected [25]. In order to compute the most likely valid code, information as to the frequency of usage of the stored codes can be taken into consideration.

A further application of the invention is envisaged where a list of bar codes is provided on a card and is read by a hand-held scanner. Such a list may comprise codes corresponding to a set of instructions for programming the reader or to the bar code symbols for a list of goods information concerning which is to be read by the bar code reader, for example, a menu. Generally in those cases it is necessary to provide a reader which is switched on and off for each bar code symbol, for example using a trigger. Such an arrangement is, of course, time consuming, and may lead to inaccuracies introduced by human error. That problem can, however, be overcome by using the "dwell time" principle discussed above in which a continuously reading beam is moved along the bar codes to be scanned, each bar code symbol is read and the corresponding information recorded once the beam has dwelled on that bar code symbol for a predetermined number of scans and hence period of time. That arrangement would reduce the possibility of accidental reads. In addition, where successive bar code symbols were identical the arrangement would cut down the likelihood of the two symbols being read as a single symbol, as, after the reader had read the first symbol before the predetermined dwell time it would record the corresponding code and then recognize that a further, identical code thereafter was also to be read. It will be appreciated that the invention could be used in many applications other than point of sale bar code scanning. For example, the invention could be used in stock-taking or inventorying of goods. In addition, the invention is not restricted to reading bar codes, but extends to reading any appropriate indicia where it is desired to read a selected item in preference to nearby items.

The reader can include a scanning beam or a fixed spot beam and the beam generating means and beam detecting means can be provided on a common body or separately.

We claim:

1. A reader for reading an indicia such as a bar code symbol, the reader comprising:

an optical arrangement for focusing a light beam within a field of view on an indicia on a target to be read;

a sensor for detecting the light reflected off the indicia and for generating an electrical signal indicative of the detected light intensity;

means for discriminating between an indicia on a target moving with respect to the reader and an indicia on a stationary target in the field of view; and means for producing an output signal corresponding only to the data of the indicia on the moving target.

2. A reader as claimed in claim 1 in which the means for discriminating comprises a dwell time measurement means for detecting the period of time that the light beam dwells on an indicia on the target.

3. A reader as claimed in claim 2, in which the optical arrangement comprises a laser scanner for scanning a light beam across an indicia and the dwell time measurement means detects the number of scans across the indicia to complete the dwell time.

4. A reader as claimed in claim 1 in which the means for discriminating comprises a motion detector.

5. A reader as claimed in claim 4 in which the motion detector is an infra red light pulse motion detector.

6. A reader as claimed in claim 1 in which the means for discriminating includes a means for computing the distance to the symbol based upon predetermined symbol density.

7. A reader for reading an indicia such as a bar code symbol, the reader comprising:

an optical arrangement for focusing a light beam within a field of view on an indicia on a target to be read;

a sensor for detecting the light reflected off the indicia and for generating an electrical signal indicative of the detected light intensity;

means for discriminating between an indicia on a target that is stationary or moving with respect to the reader and an indicia on a target being moved into the field of view and then held relatively stationary for a period of time; and means for producing an output signal corresponding only to the data of the indicia on the target moved into the field of view and then held stationary for a period of time.

8. A reader as claimed in claim 7 in which the means for discriminating comprises a dwell time measurement means for detecting indicia on which the light beam dwells for a predetermined period of time.

9. A reader as claimed in claim 7, in which the optical arrangement comprises a laser scanner for scanning a light beam across an indicia and the dwell time measurement means detects the number of scans across the indicia to complete the dwell time.

10. A method of reading an indicia such as a bar code symbol which a reader comprises an optical arrangement for focusing a light beam on an indicia; and a sensor for detecting light reflected off the indicia in which:

the optical arrangement focuses a light beam within a field of view on an indicia on a target to be read;

the sensor detects the light reflected off the indicia and generates an electrical signal indicative of the detected light intensity; and an indicia on a target moving with respect to the reader is distinguished from indicia on stationary targets in the field of view by discriminating means and an output signal is produced corresponding only to the data of the indicia on the moving target.

11. A method of reading an indicia such as a bar code symbol in which a reader comprises an optical arrangement for focusing a light beam on an indicia; and a sensor for detecting the light reflected off the indicia in which:

the light beam is focused within a field of view on an indicia on a target to be read by the optical arrangement;

light reflected off the indicia is detected by the sensor and an electrical signal is generated indicative of detected light intensity; and an indicia on a target that is moving with respect to the reader is distinguished from an indicia on a target being moved into the field of view and then held relatively stationary for a period of time by discriminating means and an output signal is produced corresponding only to the data of the indicia on the target moved into the field of view then held stationary for a period of time.

* * * * *